United States Patent
Jeong et al.

(10) Patent No.: US 7,520,637 B2
(45) Date of Patent: Apr. 21, 2009

(54) BACKLIGHT UNIT AND LIQUID CRYSTAL DISPLAY DEVICE

(75) Inventors: In Suk Jeong, Seoul (KR); Gi Bin Kim, Anyang-Si (KR); Tae Woo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 101 days.

(21) Appl. No.: 11/261,624

(22) Filed: Oct. 31, 2005

(65) Prior Publication Data

US 2006/0092666 A1 May 4, 2006

(30) Foreign Application Priority Data

Oct. 29, 2004 (KR) ............... 10-2004-0087194
Feb. 28, 2005 (KR) ............... 10-2005-0016992

(51) Int. Cl.
F21V 29/00 (2006.01)
(52) U.S. Cl. ............... 362/294; 362/561; 362/800
(58) Field of Classification Search ........ 362/294, 362/373, 547, 800, 561; 313/46
See application file for complete search history.

(56) References Cited

U.S. PATENT DOCUMENTS

| | | | | |
|---|---|---|---|---|
| 4,081,023 | A * | 3/1978 | Edelstein et al. | 165/53 |
| 5,880,524 | A * | 3/1999 | Xie | 257/704 |
| 6,154,362 | A * | 11/2000 | Takahashi et al. | 361/695 |
| 6,198,518 | B1 | 3/2001 | Kuga | |
| 6,655,825 | B2 | 12/2003 | Muthu et al. | |
| 6,789,921 | B1 * | 9/2004 | Deloy et al. | 362/252 |
| 6,857,767 | B2 * | 2/2005 | Matsui et al. | 362/373 |
| 6,880,953 | B2 * | 4/2005 | Shin | 362/225 |
| 6,917,143 | B2 * | 7/2005 | Matsui et al. | 313/35 |
| 6,971,780 | B2 * | 12/2005 | Lee et al. | 362/561 |
| 7,011,431 | B2 * | 3/2006 | Ono et al. | 362/241 |
| 7,026,748 | B2 | 4/2006 | Wammes | |
| 7,101,055 | B2 * | 9/2006 | Hsieh et al. | 362/29 |
| 7,284,874 | B2 * | 10/2007 | Jeong et al. | 362/97 |
| 2002/0157819 | A1 | 10/2002 | Norley et al. | |
| 2004/0004424 | A1 | 1/2004 | Sakurai | |
| 2004/0174651 | A1 * | 9/2004 | Aisenbrey | 361/103 |
| 2004/0213016 | A1 | 10/2004 | Rice | |
| 2005/0276053 | A1 * | 12/2005 | Nortrup et al. | 362/294 |
| 2006/0002142 | A1 * | 1/2006 | Jeong et al. | 362/612 |
| 2006/0023448 | A1 * | 2/2006 | Mok et al. | 362/231 |

FOREIGN PATENT DOCUMENTS

| | | |
|---|---|---|
| CN | 1448766 A | 10/2003 |
| CN | 2585273 Y | 11/2003 |
| DE | 10245871 A1 | 4/2004 |

(Continued)

Primary Examiner—Sandra L. O'Shea
Assistant Examiner—Gunyoung T. Lee
(74) Attorney, Agent, or Firm—Birch, Stewart, Kolasch & Birch, LLP

(57) ABSTRACT

A backlight unit and an LCD device are provided, in which an LED (light emitting diode) is used as a light source of the backlight unit, and the heat generated from the LED is rapidly discharged to the outside. The backlight unit includes in one embodiment a cover bottom; at least one heat pipe located on the cover bottom; and a plurality of light sources located on the at least one heat pipe at fixed intervals.

27 Claims, 11 Drawing Sheets

FOREIGN PATENT DOCUMENTS

| | | |
|---|---|---|
| EP | 1166173 B1 | 1/2002 |
| EP | 1519217 A1 | 3/2005 |
| JP | 03-062446 A | 3/1991 |
| JP | 10-220975 A | 8/1998 |
| JP | 2000-031546 A | 1/2000 |
| JP | 2000-161880 A | 6/2000 |
| JP | 2000-208678 A | 7/2000 |
| JP | 2002-072901 A | 3/2002 |
| JP | 2002-299700 A | 10/2002 |
| JP | 2003-100110 A | 4/2003 |
| JP | 2003-331604 A | 11/2003 |
| JP | 2004-010376 A | 1/2004 |
| JP | 2004-055160 A | 2/2004 |
| JP | 2004-204494 A | 7/2004 |

\* cited by examiner

BACKLIGHT UNIT AND LIQUID CRYSTAL DISPLAY DEVICE

This Nonprovisional Application claims priority under 35 U.S.C. §119(a) on Patent Application No. 10-2004-0087194 filed in Korea on Oct. 29, 2004 and Patent Application No. 10-2005-0016992 filed in Korea on Feb. 28, 2005, the entire contents of which are hereby incorporated by reference.

BACKGROUND OF THE INVENTION

1. Field of the Invention

The present invention relates to a liquid crystal display (LCD) device, and more particularly, to a backlight unit including a light emitting diode (LED) and an LCD device on which the backlight unit is mounted.

2. Discussion of the Related Art

A Cathode Ray Tube (CRT), one of flat display devices, has been widely used for monitors of devices such as a television, a measuring machine and an information terminal. However, the CRT has limitations to miniaturization and lightness in weight due to its big size and heavy weight. Accordingly, display devices such as a liquid crystal display (LCD) device using an electro-optics effect, a plasma display panel (PDP) using a gas discharge and an Electroluminescence display (ELD) device using an electro-luminescence effect have been actively studied, which can be the substitutes for the CRT.

Among the display devices, the LCD device is most actively studied. The LCD device having low power consumption, thin profile and lightness in weight is highly developed for being applied to monitors for a desktop computer and a large sized display device as well as for a laptop computer. Accordingly, demands for the LCD devices continuously increase.

The LCD device includes an LCD panel for displaying a picture image, a driving part for applying a driving signal to the LCD panel, and a backlight unit for providing a light source to the LCD panel. The LCD panel has first and second glass substrates bonded to each other at a predetermined interval, and a liquid crystal layer formed between the first and second glass substrates.

On the first glass substrate (TFT array substrate), there are a plurality of gate lines arranged in a first direction at fixed intervals, a plurality of data lines arranged in a second direction in perpendicular to the gate lines at fixed intervals, a plurality of pixel electrodes in respective pixel regions defined by the gate lines and the data lines in a matrix type, and a plurality of thin film transistors (TFTs) switchable in response to signals on the gate lines for transmission of signals on the data lines to the pixel electrodes.

The second glass substrate (color filter substrate) has a black matrix layer for shielding light from areas excluding the pixel regions, a color filter layer (R, G, B) for displaying colors, and a common electrode for implementing a picture image.

The first glass substrate is positioned at the predetermined interval from the second glass substrate by spacers. The first and second glass substrates are bonded to each other by a sealant having a liquid crystal injection inlet. Then, liquid crystal is injected through the liquid crystal injection inlet.

Meanwhile, the LCD device controls transmittance of ambient light to display the picture image. In this respect, the LCD device requires an additional light source such as a backlight. The backlight is classified into a direct type and an edge type according to the arrangement of lamps.

The LCD device uses the light source such as an Electro Luminescence (EL), a Light Emitting Diode (LED), a Cold Cathode Fluorescent Lamp (CCFL) or a Hot Cathode Fluorescent Lamp (HCFL). Among those light sources, the CCFL having long lifetime, low power consumption and thin profile is used as the light source for a large sized color TFT LCD device.

In case of the CCFL as the light source, a fluorescent discharge tube is used for a penning effect, which is formed by injecting a hydrargyrum gas containing Argon (Ar) and Neon (Ne) at a low temperature. Also, electrodes are formed at both ends of the fluorescent discharge tube, and the cathode is formed in a plate-shape. When a voltage is applied thereto, electric charges inside the fluorescent discharge tube collide against the plate-shaped cathode like a sputtering state, thereby generating secondary electrons. Thus, circumferential elements are excited by the secondary electrons, whereby plasma is generated. Also, the circumferential elements emit strong ultraviolet rays, and then the ultraviolet rays excite a fluorescent substance, thereby emitting visible rays.

In the edge type backlight, a lamp unit is formed at one side of a light-guiding plate. Generally, the edge type is applied to relatively small sized LCD devices such as the monitors for the laptop computer or the desktop computer. The edge type backlight is useful to obtain uniform luminance, long lifetime and thin profile in the LCD device.

Hereinafter, a related art backlight unit will be described with reference to the accompanying drawings.

FIG. 1 is a cross-sectional view of an edge type backlight unit including a fluorescent lamp according to the related art.

As shown in FIG. 1, a related art edge type backlight unit includes a fluorescent lamp 11, a lamp housing 12, a light-guiding plate 13, a reflecting sheet 14, a light-diffusion plate 15, a prism sheet 16, a protection sheet 17, and a main supporter 18. A fluorescent substance is coated on an inner surface of the fluorescent lamp 11 for emitting light. Also, the lamp housing 12 fixes the fluorescent lamp 11, and concentrates the light emitted from the fluorescent lamp 11 to one direction. The light-guiding plate 13 provides the light emitted from the fluorescent lamp 11 to an upper side of an LCD panel, and the reflecting sheet 14 is provided below the light-guiding plate 13 to guide the light leaking in an opposite side of the LCD panel toward the light-guiding plate 13. The light-diffusion plate 15 is formed over the light-guiding plate 13 to uniformly diffuse the light guided by the light-guiding plate 13. Also, the prism sheet 16 is formed over the light-diffusion plate 15 to concentrate the light diffused in the light-diffusion plate 15, and to transmit the concentrated light to the LCD panel. The protection sheet 17 is formed on an upper side of the prism sheet 16 to protect the prism sheet 16. The main supporter 18 receives and fixes the aforementioned elements.

In the aforementioned backlight unit, the light emitted from the fluorescent lamp 11 is concentrated to an incident surface of the light-guiding plate 13, and then the concentrated light passes through the light-guiding plate 13, the light-diffusion plate 15 and the prism sheet 16 in sequence, whereby the light is transmitted to the LCD panel. However, the backlight unit of using the related art fluorescent lamp has a low color realization ratio due to the emission characteristics of the light source. Furthermore, it is hard to obtain the backlight unit having high luminance due to limits in size and capacity of the fluorescent lamp.

With trend of the large-sized LCD device of 20-inch or more, the direct type backlight unit is actively developed, in which a plurality of lamps are provided in lines on a lower surface of a light-diffusion plate, whereby an entire surface of an LCD panel is directly illuminated with light. The direct type backlight unit, which has greater light efficiency as compared with that of the edge type backlight unit, is used for the large-sized LCD device requiring high luminance.

In the meantime, the edge type and direct type backlight units use the fluorescent lamp as the light source. However, the fluorescent lamp is problematic in that it requires a noxious gas. That is, the fluorescent lamp may cause the environmental contamination. Thus, new light sources have been researched and studied recently, which can prevent the environmental contamination. Among the various light sources newly developed, an LED (Light Emitting Diode) draws great attentions in that it has no environmental contamination, it can display various colors, and it can decrease the power consumption.

FIG. 2 is a plane view of a backlight unit including an LED according to the related art. FIG. 3 is a cross sectional view of an LCD device, on which a backlight unit is mounted, along I-I' of FIG. 2. As shown in FIG. 2, a backlight unit including an LED according to the related art includes a cover bottom 20 (shown in FIG. 3), a plurality of metal PCBs (Printed Circuit Board) 75, a plurality of red R, green G and blue B LEDs 70a, 70b and 70c, and a plurality of optical sheets 50 (shown in FIG. 3).

The metal PCBs 75 are formed in parallel to one another on the cover bottom 20. Then, the red R, green G and blue B LEDs 70a, 70b and 70c are arranged at fixed intervals on each of the metal PCBs 75. Also, the optical sheets 50 are formed on the red R, green G and blue B LEDs 70a, 70b and 70c.

The backlight unit including the LEDs, shown in FIG. 2, is formed in a direct type, in which the LEDs 70a, 70b and 70c are formed below the LCD panel 40 (shown in FIG. 3). As shown in FIG. 3, the LCD device, which includes the backlight unit comprising of the LEDs according to the related art, includes the cover bottom 20, the metal PCBs 75, the red R, green G and blue B LEDs 70a, 70b and 70c, the optical sheets 50, the LCD panel 40, a guide panel 60, and a case top 30.

The metal PCBs 75 are formed on the cover bottom 20, wherein the metal PCBs 75 are formed in parallel. Then, the red R, green G and blue B LEDs 70a, 70b and 70c are formed at fixed intervals on each of the metal PCBs 75. Then, the optical sheets 50 are formed on the LEDs 70. The LCD panel 40 is formed on the optical sheets 50. The guide panel 60 supports the LCD panel 40 and the optical sheets 50. Also, the case top 30 is provided at an upper edge of the LCD panel 40 and lateral sides of the guide panel 60 and the cover bottom 20. Each of the LEDs 70 includes a body 73 and a light-emission part 71. A reflecting sheet 25 is formed between the body 73 and the light-emission part 71.

The guide panel 60 has a protruding pattern. The protruding pattern of the guide panel 60 is positioned between the optical sheets 50 and the LCD panel 40, whereby the predetermined interval is formed between the optical sheets 50 and the LCD panel 40. Also, the cover bottom 20 is positioned at the predetermined interval from the lower surface of the optical sheets 50. Thus, it is possible to provide a space for receiving the metal PCBs 75 and the LEDs 70 between the cover bottom 20 and the optical sheets 50. The metal PCBs 75 are formed at fixed intervals. The metal PCBs 75 help the discharge of heat emitted from the LEDs 70.

The LCD panel 40 includes lower and upper substrates bonded to each other at the predetermined interval, a liquid crystal layer (not shown) formed between the lower and upper substrates, and lower and upper polarizing sheets respectively formed on outer surfaces of the lower and upper substrates. The optical sheets 50 are formed of first and second prism sheets, and a light-diffusion sheet.

For displaying images on the LCD panel 40, the backlight unit turns on the LEDs 70. In this case, a voltage may be applied to all of the red R, green G and blue B LEDs 70a, 70b and 70c, or may be selectively applied to the red R, green B and blue B LEDs 70a, 70b and 70c. Thus, the light emitted from the red R, green G and blue B LEDs is color-mixed in the space between the optical sheets 50 and the LEDs 70, whereby the rear surface of the LCD panel 40 is irradiated with the mixed light.

In the backlight unit including the LEDs, the LEDs 70 are mounted on each of the metal PCBs 75, and each of the metal PCB 75 is connected with the cover bottom 20. In comparison with a CCFL (Cold Cathode Fluorescent Lamp), the LED 70 has the lower light efficiency. Thus, to obtain the desirable luminance on the entire surface of the LCD panel, it is necessary to increase the power consumption. That is, the LED 70 generates more heat than the CCFL.

In the aforementioned structure, the heat generated from the LED 70 is mostly conducted and diffused to the metal PCB 75, and is then discharged to the outside through the cover bottom 20. In this case, the metal PCB 75 is formed of aluminum, and the cover bottom 20 is formed of aluminum, aluminum alloy, or MCPET (Micro Polyethyene Ether-phthalein).

The aluminum or aluminum alloy has a thermal conduction coefficient below 100 W/mK, and MCPET has a thermal conduction coefficient of 0.2 W/mK. Thus, it is impossible to discharge the heat generated from the LEDs 70 to the outside in a short time. Also, the heat generated from the LEDs 70 is discharged to the outside through the lower side (PCB and cover bottom) of the backlight unit. That is, only small amount of heat is discharged through the lower side of the backlight unit. Therefore, it is impossible to achieve the thermal reliability of LED in operation of the LCD device.

That is, the backlight unit including the LEDs according to the related art has the following disadvantages.

In the backlight unit according to the related art, the LEDs are positioned on each of the PCBs, wherein the PCBs are formed of aluminum. That is, the heat generated from the LEDs is discharged to the outside through the PCBs. If driving the backlight unit for a long time, it is impossible to discharge the heat generated from the LEDs to the outside of the backlight unit in a short time due to the limitation in thermal conduction of aluminum.

Also, the heat generated from the LEDs is discharged to the outside through the PCBs and the cover bottom. Therefore, it is impossible to discharge the generated heat to the outside in a short time.

Furthermore, the heat is mostly generated in the LED chip. However, the LED chip has no space for discharging the heat since the reflecting sheet is formed in correspondence with the LED chip. Therefore, it is difficult to discharge the generated heat to the outside in a short time. Accordingly, the temperature increases in the junction between each of the LEDs, thereby deteriorating the reliability in operation of the LED.

SUMMARY OF THE INVENTION

Accordingly, the present invention is directed to a backlight unit and an LCD device that substantially obviate one or more problems due to limitations and disadvantages of the related art.

An object of the present invention is to provide a backlight unit and an LCD device, in which an LED (Light Emitting Diode) is used as a light source of the backlight unit, and the heat generated from the LED is rapidly discharged to the outside.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a cover bottom; at least one heat pipe located on the cover bottom; and a plurality of light sources located on the at least one heat pipe at fixed intervals.

In another aspect of the present invention, a backlight unit includes a cover bottom; a plurality of printed circuit boards (PCBs) arranged in parallel to one another on the cover bottom; a plurality of light sources on each of the PCBs at fixed intervals; a reflecting sheet for reflecting light emitted from the light sources upwardly; and a graphite spreader, formed on a bottom surface of the reflecting sheet, for discharging heat generated from the plurality of light sources.

In another aspect of the present invention, an LCD device includes a cover bottom; at least one heat pipe located on the cover bottom; a plurality of LEDs formed on the at least heat pipe at fixed intervals; and an LCD panel located above the plurality of LEDs.

In another aspect of the present invention, an LCD device includes a cover bottom; a plurality of PCBs (Printed Circuit Boards) arranged in parallel to one another on the cover bottom; a plurality of LEDs on each of the PCBs at fixed intervals; a reflecting sheet, provided in the circumference of the LEDs, for reflecting light emitted from the LEDs upwardly; a graphite spreader, formed on a bottom surface of the reflecting sheet, for discharging heat generated from the plurality of LEDs; and an LCD panel located above the plurality of LEDs.

In another aspect of the present invention, an LCD device includes a cover bottom; at least one heat pipe located on the cover bottom; a plurality of LEDs formed on at least one heat pipe at fixed intervals; a reflecting sheet, formed in the circumference of the LEDs, for reflecting light emitted from the LEDs upwardly; a graphite spreader, formed on a lower surface of the reflecting sheet, for discharging heat generated from the plurality of LEDs to the outside; and an LCD panel located above the plurality of LEDs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit and an LCD device according to the present invention will be described with reference to the accompanying drawings.

Figure 1:
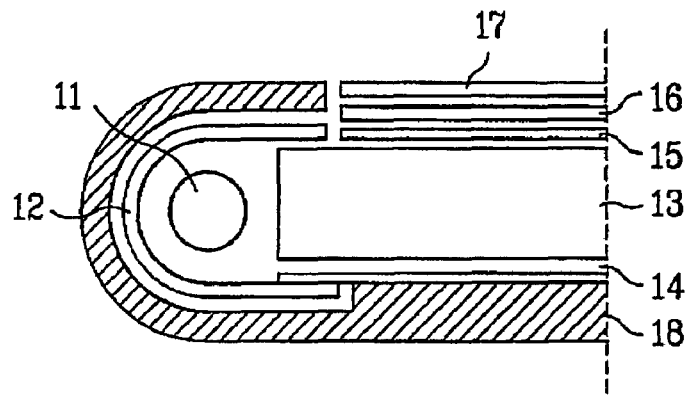
FIG. 1 is a cross-sectional view of a backlight unit including a fluorescent lamp according to the related art.
Figure 2:
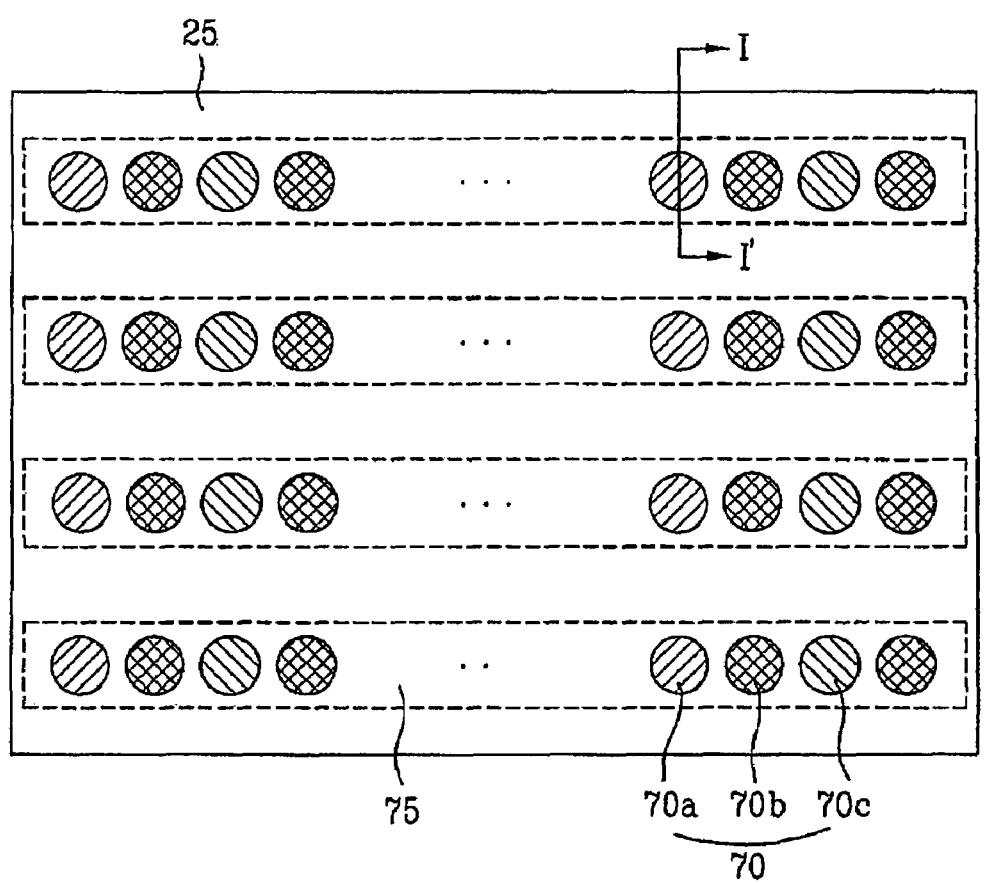
FIG. 2 is a plane view of a backlight unit including an LED according to the related art.
Figure 3:
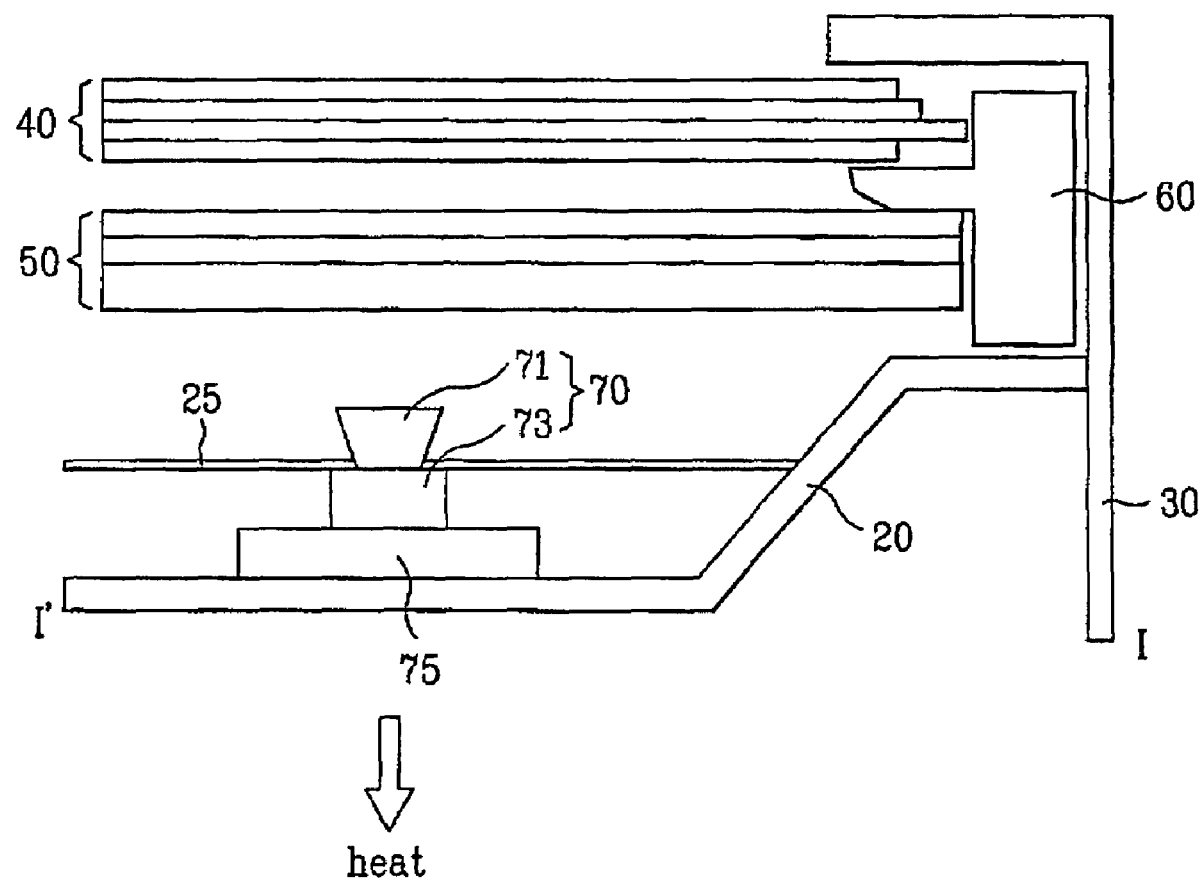
FIG. 3 is a cross-sectional view of an LCD device including a backlight unit, along I-I' of FIG. 2.
Figure 4:
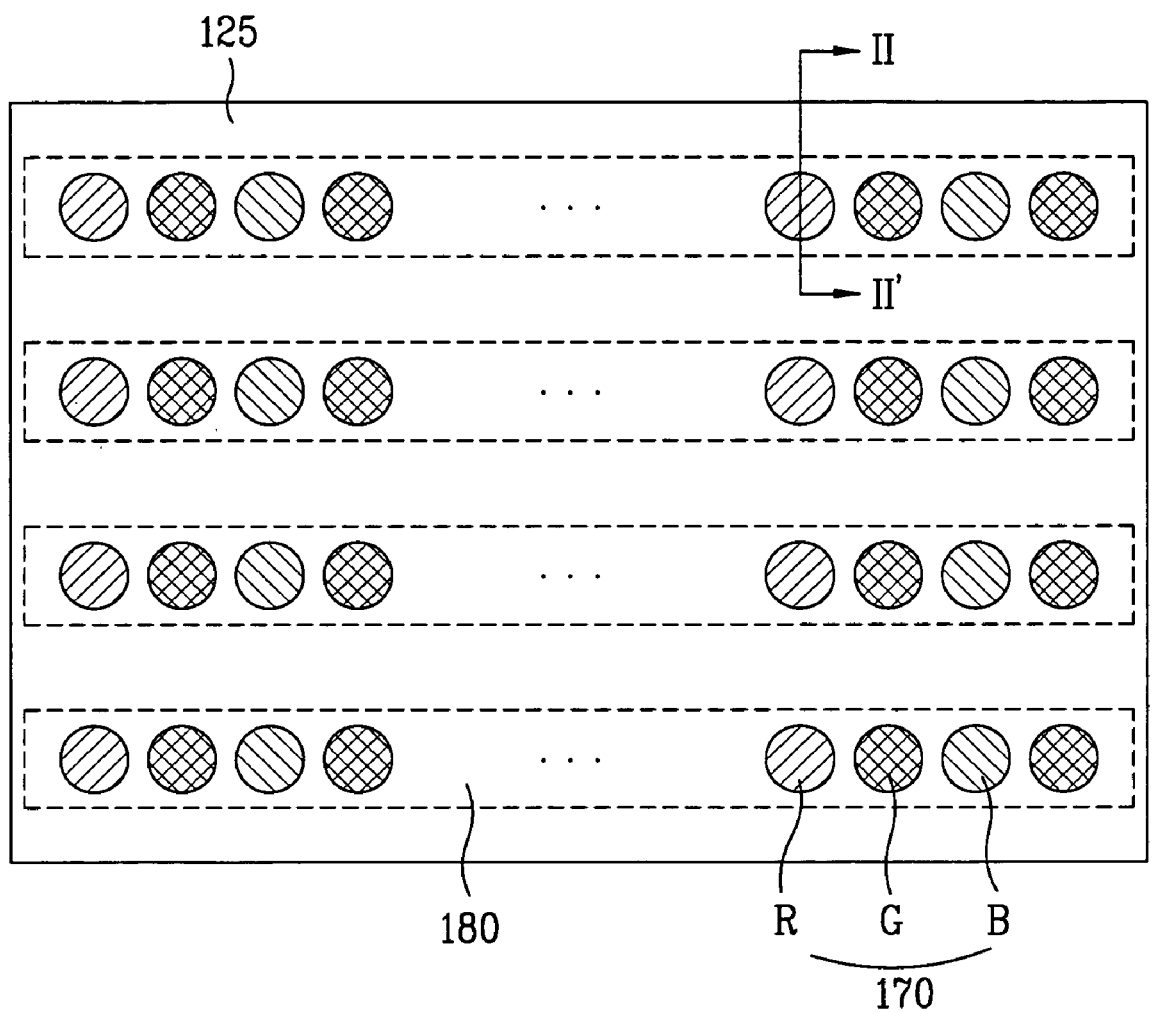
FIG. 4 is a plane view of a backlight unit according to the first embodiment of the present invention.
Figure 5:
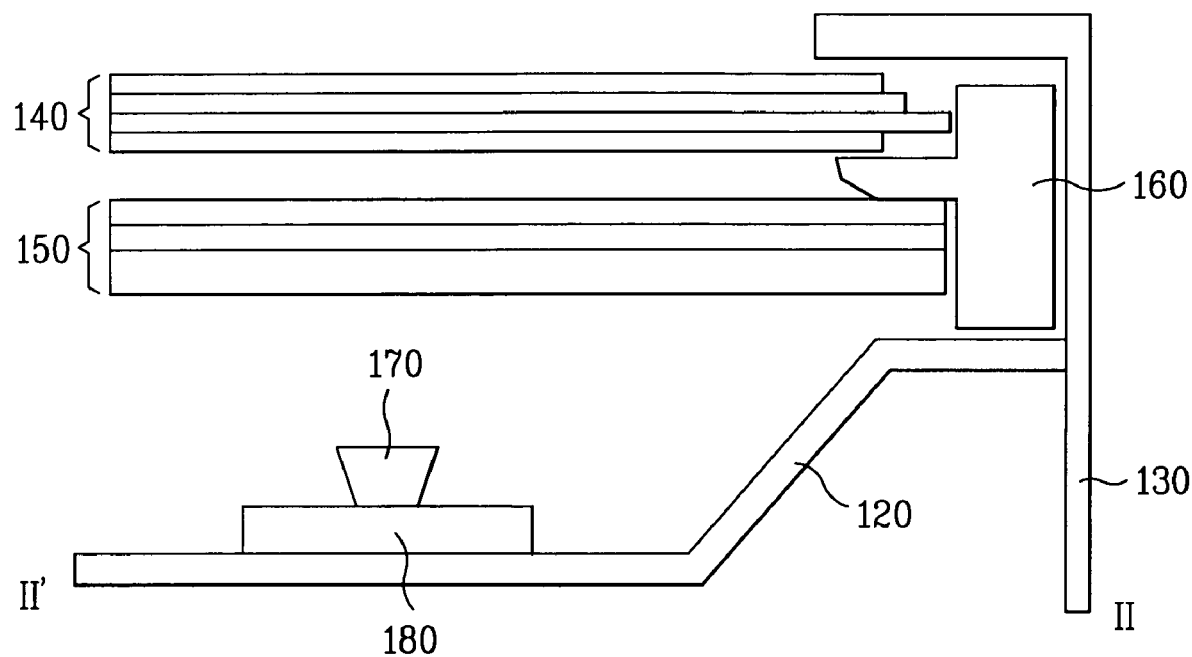
FIG. 5 is a cross-sectional view of an LCD device, to which a backlight unit is mounted, according to the first embodiment of the present invention, along II-II' of FIG. 4.

FIG. 4 is a plane view of a backlight unit according to the first embodiment of the present invention. FIG. 5 is a cross-sectional view of an LCD device, to which a backlight unit is mounted, according to the first embodiment of the present invention, along II-II' of FIG. 4. As shown in FIG. 4, a backlight unit according to the first embodiment of the present invention includes a cover bottom 120 (shown in FIG. 5), a plurality of heat pipes 180, a plurality of red R, green G and blue B LEDs, and a plurality of optical sheets 150 (shown in FIG. 5).

The heat pipes 180 are formed in parallel to one another on the cover bottom 120. Then, the red R, green G and blue B LEDs are provided at fixed intervals, wherein the red R, green G and blue B LEDs are formed on each of the heat pipes 180. Also, the optical sheets 150 are provided on the red R, green G and blue B LEDs. The heat pipes 180 are provided at fixed intervals, and the LEDs 170 are formed at fixed intervals on each of the heat pipes 180. The backlight unit including the LEDs, shown in FIG. 4, is formed in a direct type, in which the LEDs 170 are formed in arrays below an LCD panel 140.

Figure 7:
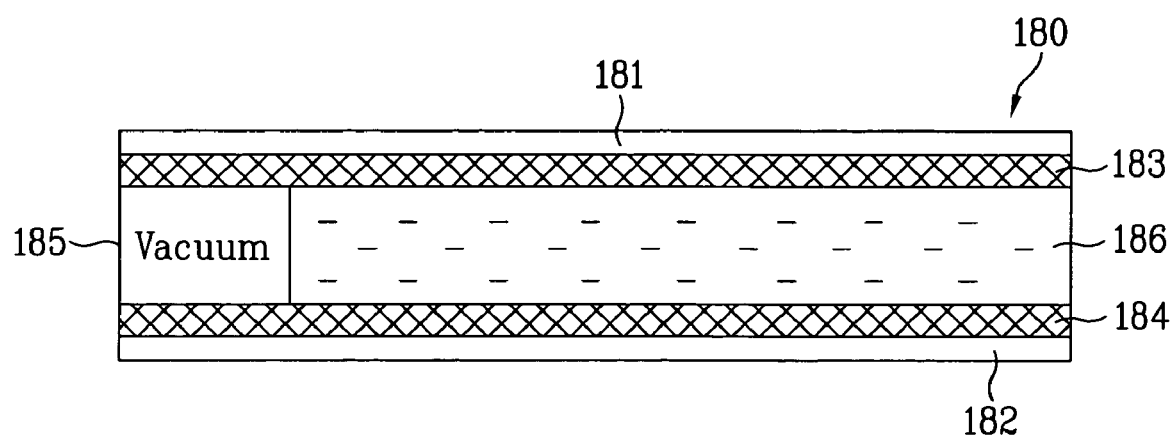
FIG. 7 is a cross-sectional view of a heat pipe of FIG. 4 according to the first embodiment of the present invention.

Each of the heat pipes 180 is formed in shape of a plate as shown in FIG. 7. The heat pipe 180 is formed of two metal plates positioned at the predetermined interval. A working fluid of a great latent heat is provided in a space between the two metal plates. That is, the heat pipe 180 transmits the heat through the working fluid.

As shown in FIG. 5, an LCD device including the LED according to the first embodiment of the present invention includes the cover bottom 120, the heat pipes 180 the red R, green G and blue B LEDs 170 the optical sheets 150, the LCD panel 140, a guide panel 160, and a case top 130.

The heat pipes 180 are formed in parallel to one another on the cover bottom 120. Then, the red R, green G and blue B LEDs are positioned at fixed intervals, wherein the red R, green G and blue B LEDs are formed on each of the heat pipes 180. Also, the optical sheets (150 of FIG. 5) are provided on the red R, green G and blue B LEDs. The LCD panel 140 is formed on the optical sheets 150, and the guide panel 150 supports the LCD panel 140 and the optical sheets 150. Then, the case top 130 is provided at an upper edge of the LCD panel 140 and lateral sides of the guide panel 160 and the cover bottom 120.

In this case, the guide panel 160 has a protruding pattern. The protruding pattern of the guide panel 160 is positioned between the optical sheets 150 and the LCD panel 140, whereby the predetermined interval is formed between the optical sheets 150 and the LCD panel 140.

Also, the cover bottom 120 is positioned at the predetermined interval from the lower surface of the optical sheets 150. Thus, it is possible to provide a space for receiving the heat pipes 180 and the LEDs 170 between the cover bottom 120 and the optical sheets 150.

Figure 11:
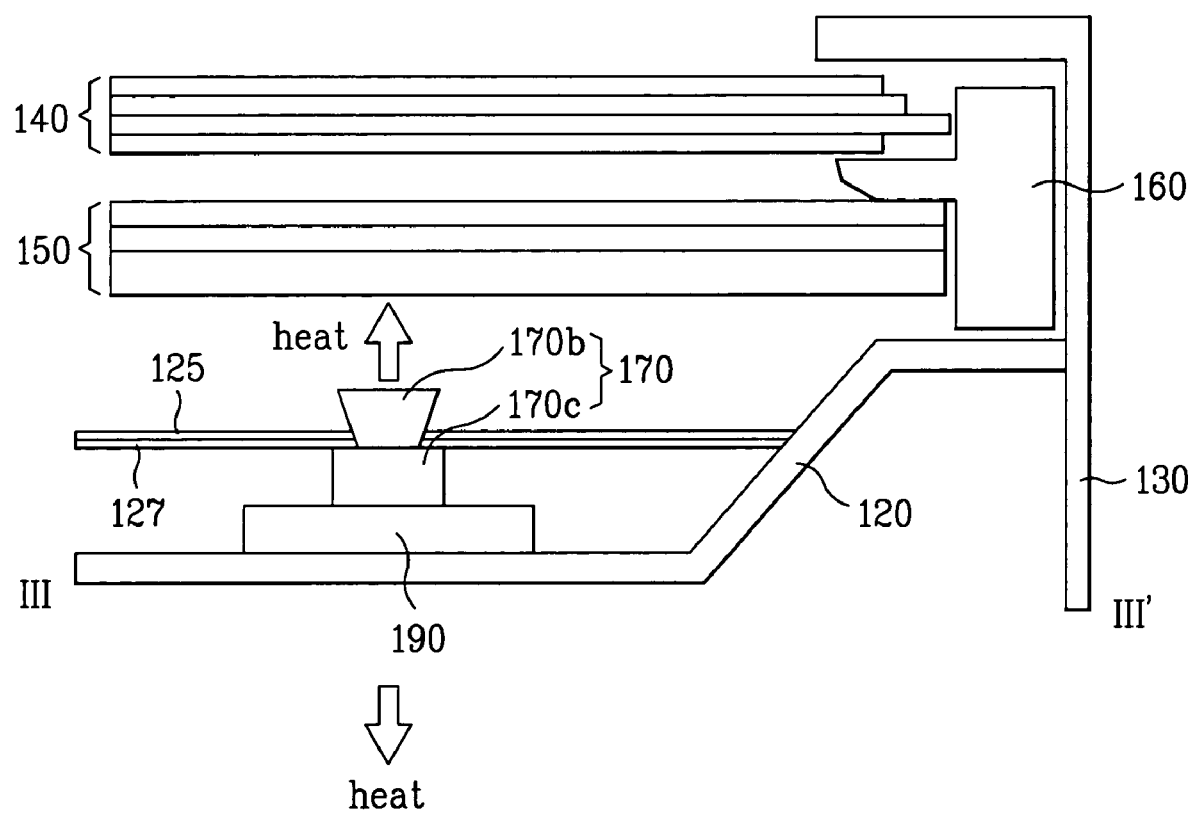
FIG. 11 is a cross-sectional view of an LCD device, to which a backlight unit is mounted, according to the second embodiment of the present invention, along III-III' of FIG. 10.

In addition, a plurality of PCBs are formed at a proper location in the LCD device and are electrically connected to the LEDs 170. For example, the PCBs may be located directly below the LEDs 170 as shown in FIG. 11. The PCBs may also be located below the heat pipes 180 between the heat pipes 180 and the LEDs 170 or between adjacent heat pipes 180.

The heat pipes 180 are formed at fixed intervals. The heat pipes 180 help the discharge of heat emitted from the LEDs 170. In addition, the heat pipes 180 may also help reflecting the light emitted from the LEDs 170. For example, a special treatment on the surface of the heat pipe may be made to provide a reflecting surface of the heat pipe so that the light emitted from the LEDs 170 can be reflected toward the LCD panel 140. In addition to or as an alternative to the reflecting surface of the heat pipe, an additional reflecting sheet may be provided in the circumference of the LEDs as shown in FIG. 11, for reflecting light emitted from the LEDs 170 upwardly.

The LCD panel 140 includes lower and upper substrates bonded to each other at the predetermined interval, a liquid crystal layer (not shown) formed between the lower and upper substrates, and lower and upper polarizing sheets respectively formed on outer surfaces of the lower and upper substrates. The optical sheets 150 are formed of first and second prism sheets, and a light-diffusion sheet.

For displaying images on the LCD panel 140, the backlight unit turns on the LEDs 170. In this case, a voltage may be applied to all of the red R, green G and blue B LEDs, or may be selectively applied to the red R, green G and blue B LEDs. Thus, the light emitted from the red R, green G and blue B LEDs is color-mixed in the space between the optical sheets 150 and the LEDs 170, whereby the rear surface of the LCD panel 140 is irradiated with the mixed light.

Figure 6:
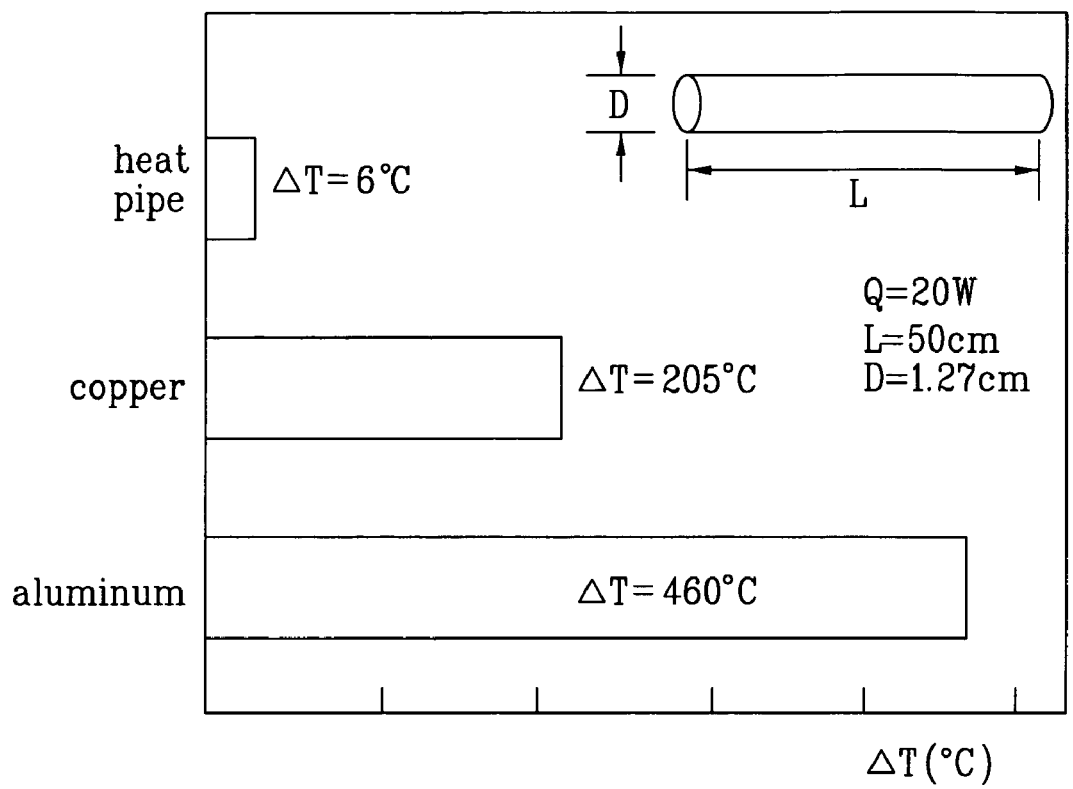
FIG. 6 is a comparative chart of showing a thermal conduction efficiency of a heat pipe according to the first embodiment of the present invention.

FIG. 6 is a comparative chart of showing a thermal conduction efficiency of a heat pipe according to the first embodiment of the present invention. That is, when each of material patterns (heat pipe, copper, and aluminum) has a length (L) of 50 cm and a circle-shaped cross section having a diameter (D) of 1.27 cm, it shows the temperature difference required for transmitting the heat of 20 W.

Referring to FIG. 6, when transmitting the heat of 20 W, aluminum requires the temperature difference of 460° C., copper requires the temperature difference of 205° C., and the heat pipe requires the temperature difference of 6° C. Accordingly, the heat pipe has the greater thermal conduction capacity than the other metal patterns such as aluminum and copper.

Figure 8:
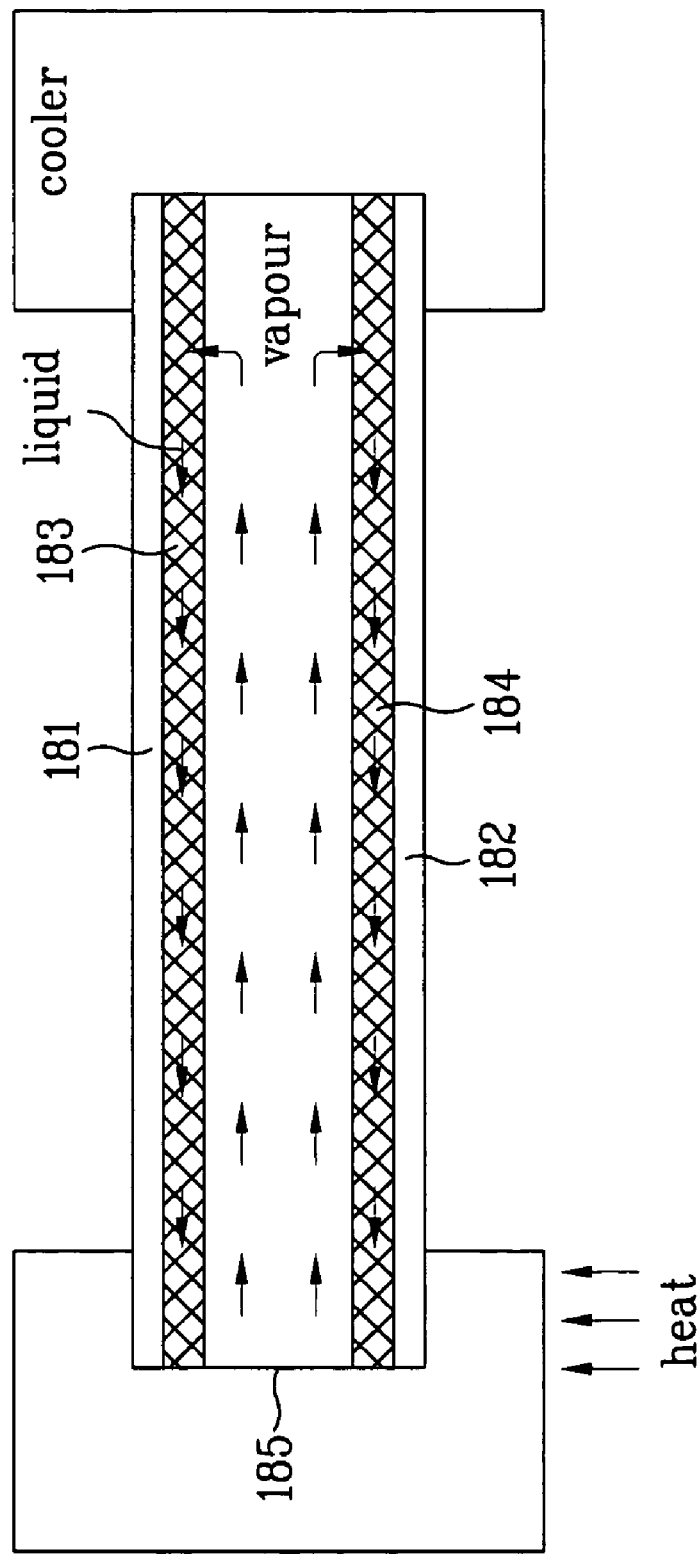
FIG. 8 is a cross-sectional view of a heat-transmittance process of a heat pipe according to the first embodiment of the present invention.

Hereinafter, a structure of the heat pipe will be described as follows. FIG. 7 is a cross-sectional view of the heat pipe of FIG. 4 according to the first embodiment of the present invention. FIG. 8 is a cross-sectional view of a heat-transmittance process of the heat pipe according to the first embodiment of the present invention. As shown in FIG. 7, each of the heat pipes 180 include first and second plates 181 and 182, first and second wicks 183 and 184, a sealing layer 185, and a working fluid 186. The first and second plates 181 and 182 are provided opposite to each other at the predetermined interval. The first and second wicks 183 and 184 are respectively formed on opposite surfaces of the first and second plates 181 and 182. Then, the sealing layer 185 seals the predetermined space between the first and second plates 181 and 182. After that, the working fluid 186 is provided inside the space, formed between the first and second plates 181 and 182, sealed by the sealing layer 185.

The first and second plates 181 and 182 are formed of metal such as copper or other materials. The first and second wicks 183 and 184 are formed in shape of net, wherein the inside of net is empty. The sealing layer 185 prevents the working fluid 186 from flowing out of the heat pipe 180. Also, the sealing layer 185 seals the predetermined space between the first and second plates, for the smooth circulation of the working fluid 186 inside the space between the first and second plates 181 and 182.

The working fluid 186 is a liquid material having the great latent heat, wherein the latent heat of working fluid is similar to or greater than water. In the first embodiment of the present invention, the working fluid 186 is formed of water.

Referring to FIG. 8, if one end of the heat pipe 180 receives the heat, the working fluid 186 inside the heat pipe 180 circulates. Supposing that the working fluid is formed of water, when the heat is applied to one end of the heat pipe 180 the working fluid, positioned at one end of the heat pipe, is changed to vapor. The vapor is moved to the other end of the heat pipe 180 whereby the other end of the heat pipe functions as a cooler. Then, the vapor is changed to liquid by change of phase. Thus, the vapor and liquid circulates inside the heat pipe 180. In this case, if the other end of the heat pipe 180 is grounded, the other end serves as the cooler for discharging the heat to the outside.

In the backlight unit according to the first embodiment of the present invention, the heat pipe 180 is positioned on the cover bottom 120. That is, the heat generated from the LEDs 170 on the heat pipe 180 is discharged to the outside through the heat pipe 180. In case of a backlight unit according to the related art, LEDs are positioned on metal PCBs, so it has the limitation to heat discharge.

In the backlight unit according to the first embodiment of the present invention, the heat pipe 180 having the great thermal conduction efficiency is provided under the LEDs. Accordingly, it is possible to rapidly discharge the heat generated from the LEDs 170 to the outside.

That is, the heat generated from the LEDs 170 does not stay in a junction between the LED 170 and the heat pipe 180. The heat generated from the LEDs 170 is transmitted to the cover bottom 120 and is discharged to the outside, thereby improving the reliability in operation. Therefore, it is practicable to realize the great light efficiency with improvement of the reliability in operation, thereby increasing the brightness.

Figure 9:
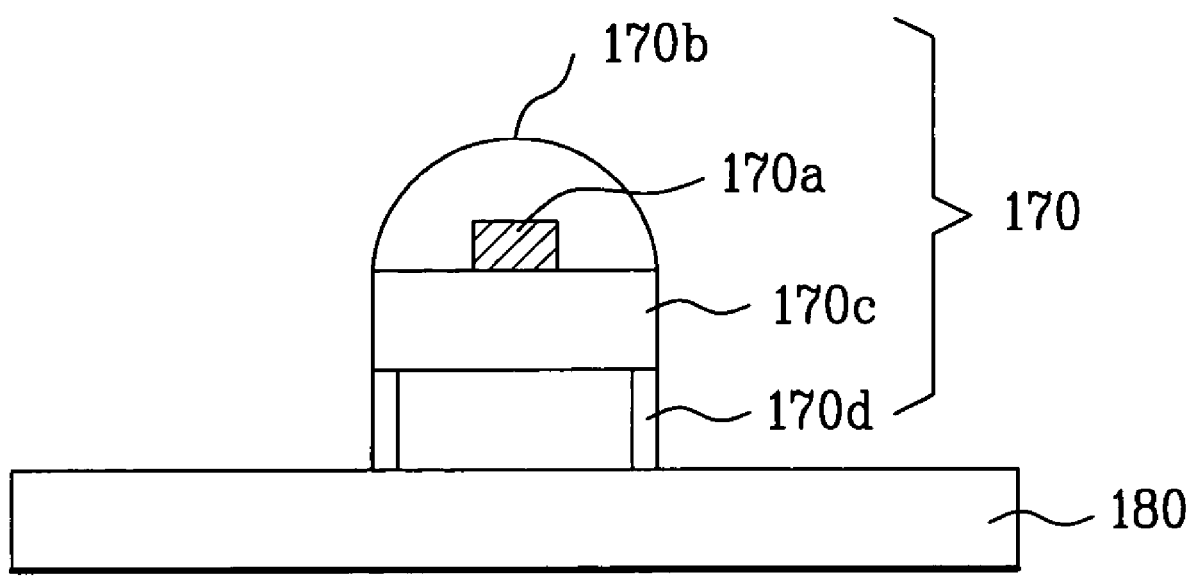
FIG. 9 is a cross-sectional view of an LED of FIG. 4 according to the first embodiment of the present invention.

FIG. 9 is a cross-sectional view of the LED of FIG. 4 according to the first embodiment of the present invention. Referring to FIG. 9, each LED 170 includes a chip 170a, a transparent mold or lens 170b, a body 170c, and chip dies 170d. At this time, the chip 170a emits the light, and the transparent mold or lens 170b is coated on a surface of the chip 170*a*. Then, the body 170*c* supports the chip 170*a* and the transparent mold or lens 170*b*. Also, the chip dies 170*d* are formed under both ends of the body 170*c*.

The chip dies 170*d* are adhered to the heat pipe 180 by soldering. In addition, an insulating layer having a low heat conduction coefficient is interposed between the body 170*c* and the heat pipe 180.

Figure 10:
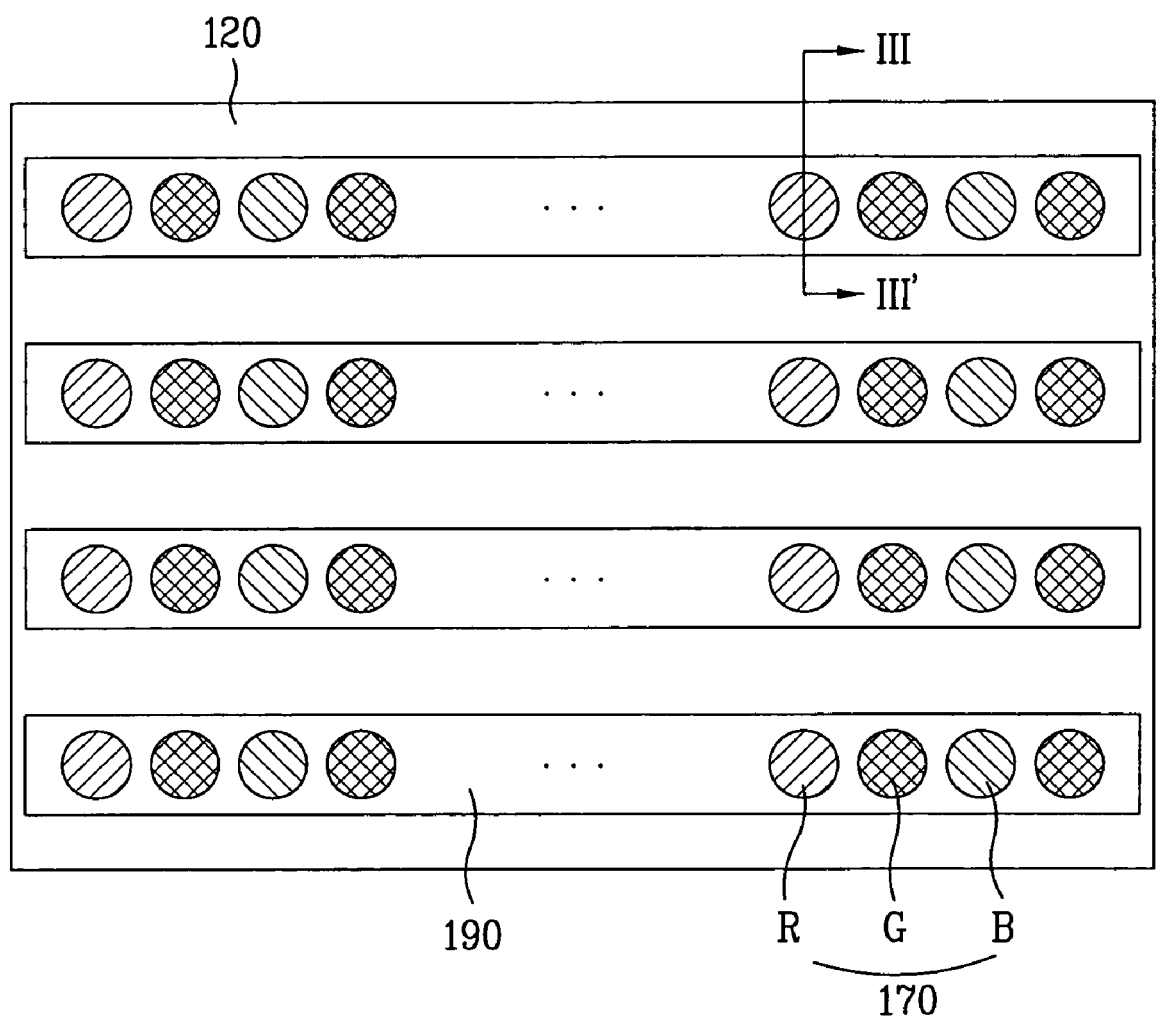
FIG. 10 is a plane view of a backlight unit according to the second embodiment of the present invention.

FIG. 10 is a plane view of a backlight unit according to the second embodiment of the present invention. FIG. 11 is a cross-sectional view of an LCD device, to which a backlight unit is mounted, according to the second embodiment of the present invention, along III-III' of FIG. 10. As shown in FIG. 10, a backlight unit according to the second embodiment of the present invention includes a cover bottom 120, a plurality of PCBs (Printed Circuit Board) 190, a plurality of red R, green G and blue B LEDs 170 a reflecting sheet 125, a graphite spreader (127 of FIG. 11), and a plurality of optical sheets 150 (shown in FIG. 11).

The PCBs 190 are formed in parallel to one another on the cover bottom 120. Then, the red R, green G and blue B LEDs 170 are formed at fixed intervals on each of the PCBs 190. The reflecting sheet 125 reflects the light emitted from the LEDs 170 to an upper side. Also, the graphite spreader 127 is formed under the reflecting sheet 125, wherein the graphite spreader 127 discharges the heat generated from the LEDs 170. The optical sheets are positioned over the LEDs 170.

In the backlight unit according to the second embodiment of the present invention, the heat generated from the LEDs 170 spreads to the up side and down side by the graphite spreader 127. The heat concentrated on a chip of the LED 170 is transmitted to the reflecting sheet 125, an upper side of a lens of the LED 170 and a lower side of the cover bottom (120 of FIG. 11), and is then discharged to the outside therethrough. The graphite spreader 127 has the great heat-diffusion capacity, whereby the heat generated in the inner chip of the LED 170 is diffused to the surroundings for a short time. Also, the heat generated from the LED 170 is diffused to the lower and upper sides of the LED 170 by convention and conduction, thereby maximizing the heat-diffusion.

In detail, the thermal conduction coefficient of the graphite spreader corresponds to 400 W/mK to 800 W/mK. In comparison to the related art structure of forming PCBs and a cover bottom below a reflecting sheet, the aforementioned structure according to the present invention, which includes the graphite spreader, has greater heat-diffusion efficiency. Thus, the backlight unit according to the present invention achieve the reliability in operation.

In the meantime, the cover bottom 120 is formed of MCPET (Micro Polyethylene Ether-phthalein), wherein MCPET has a thermal conduction coefficient of 0.2 W/mK. Also, the PCB 190 is formed of AlSET (alloy of Al and E60L), wherein AlSET has a thermal conduction coefficient of 100 W/mK. That is, the thermal conduction coefficient for each of MCPET and AlSET is smaller than the thermal conduction coefficient for the graphite spreader 127. Thus, the neat is most diffused in the graphite spreader 127 adjacent to the LED 170.

The thermal conduction efficiency in the backlight unit according to the second embodiment of the present invention is four times to four-thousand times greater than the thermal conduction efficiency in a backlight unit according to the related art which includes only PCBs and cover bottom.

The thermal conduction coefficients for various materials as well as the graphite spreader will be shown in the following table 1.

TABLE 1

| Material | Thermal Conduction Coefficient (W/mK) |
| --- | --- |
| Graphite spreader | 400~800 |
| MCPET | 0.2 |
| AlSET | ≦100 |

As shown in the Table 1, the thermal conduction coefficient for the graphite spreader is greater than the thermal conduction coefficient for either MCPET or AlSET.

The backlight unit including the LEDs, shown in FIG. 10, is formed in a direct type, in which the LEDs 170 are formed in arrays below the LCD panel (140 of FIG. 11).

The graphite spreader 127 is formed in a plate shape, which may be adhered to the lower surface of the reflecting sheet 125, or may be formed at the predetermined interval from the lower surface of the reflecting sheet 125.

To form the graphite spreader 127, after spraying graphite particles, the sprayed graphite particles are solidified in a plate shape by pressure. In comparison to the cover bottom 120 or the PCB 190, the graphite spreader 127 has the greater heat-diffusion efficiency (thermal conductivity).

As shown in FIG. 11, an LCD device including the backlight unit according to the second embodiment of the present invention includes the cover bottom 120, the PCBs 190, the red R, green G and blue B LEDs 170 the reflecting sheet 125, the graphite spreader 127, the optical sheets 150, the LCD panel 140, a guide panel 160, and a case top 130.

The PCBs 190 are formed in parallel to one another on the cover bottom 120. Then, the red R, green G and blue B LEDs 170 are formed at fixed intervals on each of the PCBs 190. The reflecting sheet 125 reflects the light emitted from the LEDs 170 to an upper side. Also, the graphite spreader is formed under the reflecting sheet 125, wherein the graphite spreader discharges the heat generated from the LEDs 170. The optical sheets are positioned over the LEDs 170. The LCD panel 140 is formed on the optical sheets 150. The guide panel 160 supports the LCD panel 140 and the optical sheets 150. Also, the case top 130 is provided at an upper edge of the LCD panel 140 and lateral sides of the guide panel 160 and the cover bottom 120.

In this case, the guide panel 160 has a protruding pattern. The protruding pattern of the guide panel 160 is positioned between the optical sheets 150 and the LCD panel 140, whereby the predetermined interval is formed between the optical sheets 150 and the LCD panel 140.

Also, the cover bottom 120 is positioned at the predetermined interval from the lower surface of the optical sheets 150. Thus, it is possible to provide a space for receiving the PCBs 190 and the LEDs 170 between the cover bottom 120 and the optical sheets 150. The PCBs 190 are formed at fixed intervals. The PCBs 190 help the uniform discharge of heat emitted from the LEDs 170.

The LCD panel 140 includes lower and upper substrates bonded to each other at the predetermined interval, a liquid crystal layer (not shown) formed between the lower and upper substrates, and lower and upper polarizing sheets respectively formed on outer surfaces of the lower and upper substrates. The optical sheets 150 are formed of first and second prism sheets, and a light-diffusion sheet.

For displaying images on the LCD panel 140, the backlight unit turns on the LEDs 170. In this case, a voltage may be applied to all of the red R, green G and blue B LEDs, or may be selectively applied to the red R, green G and blue B LEDs. Thus, the light emitted from the red R, green G and blue B LEDs is color-mixed in the space between the optical sheets 150 and the LEDs 170, whereby the rear surface of the LCD panel 140 is irradiated with the mixed light.

A method for assembling the graphite spreader 127 will be explained as follows.

Figure 12A:
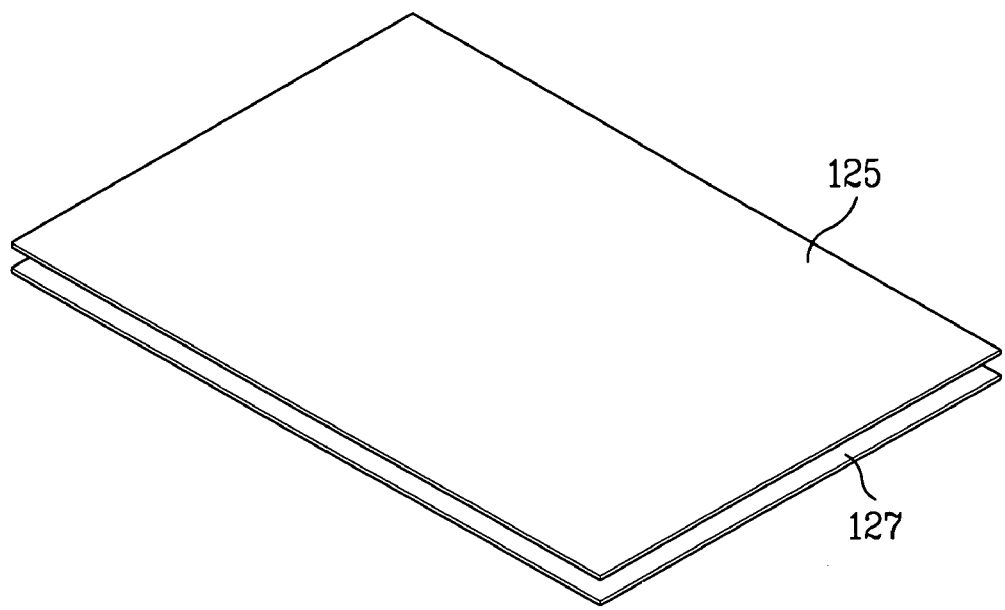
FIGS. 12A to 12C are perspective views of the process for assembling a reflecting sheet, a graphite plate, and an LED according to the second embodiment of the present invention.
Figure 12B:
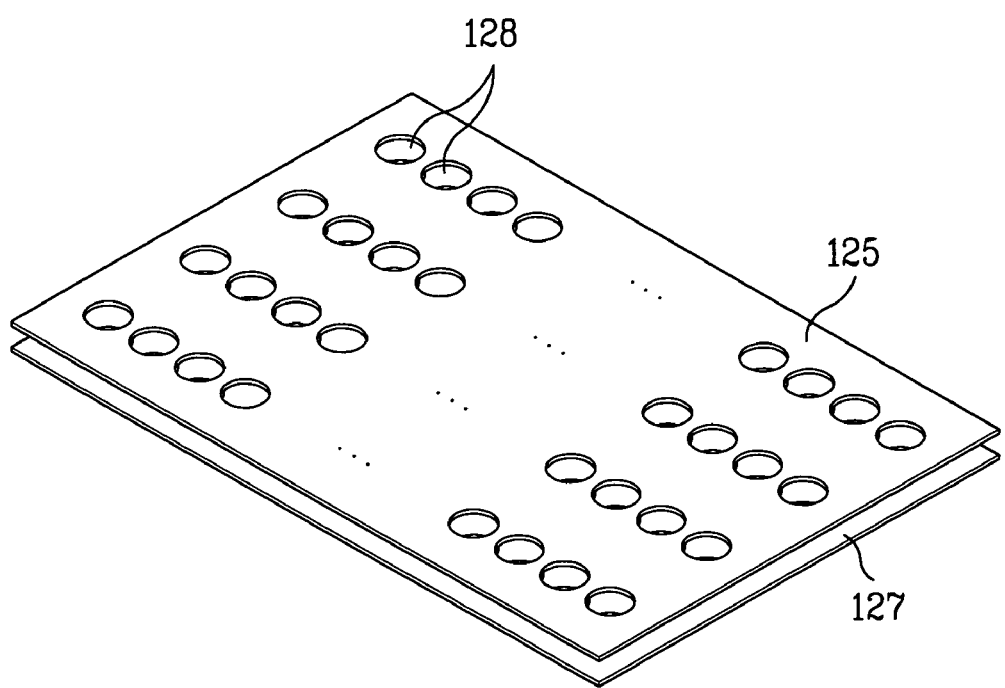
Figure 12C:
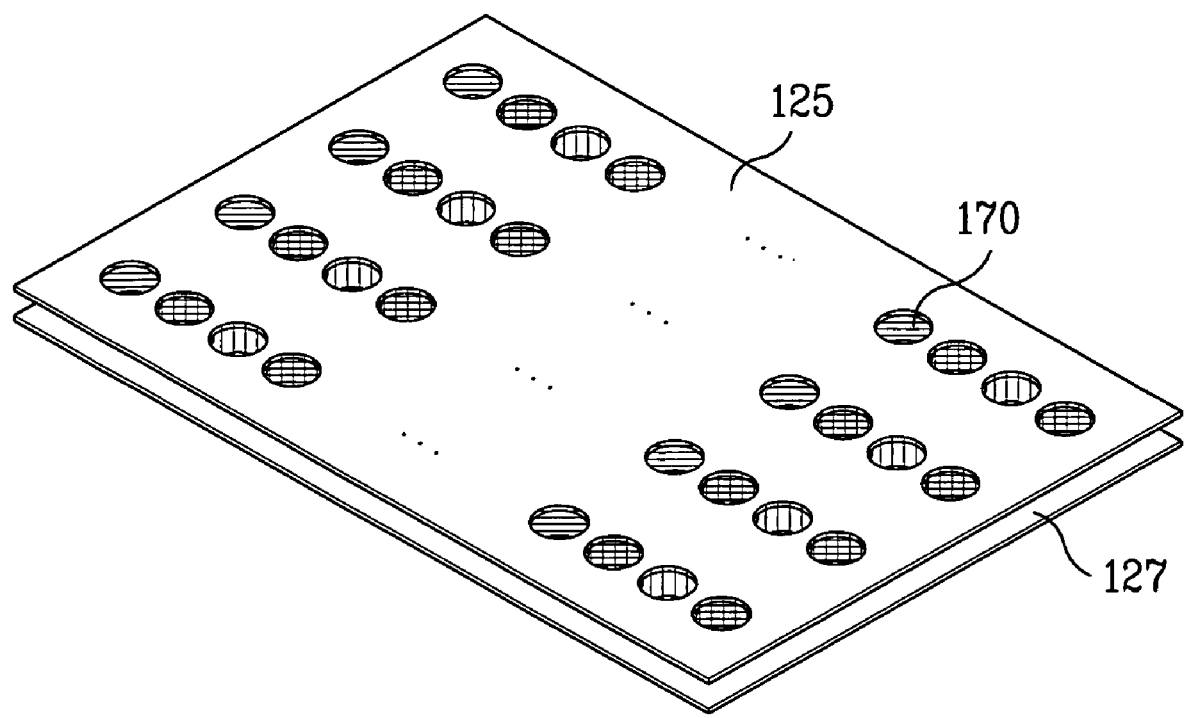

FIGS. 12A to 12C are perspective views of the process for assembling the reflecting sheet, the graphite plate, and the LED according to the second embodiment of the present invention. First, as shown in FIG. 12A, the graphite spreader 127 is adhered to the lower surface of the reflecting sheet 125. At this time, the graphite spreader 127 is formed in the plate shape by solidifying the graphite particles.

Referring to FIG. 12B, a plurality of holes 128 are formed in the reflecting sheet 125 and the graphite spreader 127, wherein the holes 128 are respectively provided in correspondence with the LEDs 170. Through the holes 128, respective lenses of the LEDs 179 come out. In this case, the holes of the reflecting sheet 125 are formed in correspondence with the holes of the graphite spreader 127.

The reflecting sheet 125 may be adhered to the graphite spreader 127 by providing an additional adhesion layer therebetween. In another way, the reflecting sheet 125 may be stacked on the graphite spreader 127 without forming the additional adhesion layer. If the holes are formed after adhering the reflecting sheet 125 to the graphite spreader 127, it is possible to form the holes in the simplified process and to avoid a hole-shifting problem between the reflecting sheet 125 and the graphite spreader 127.

Referring to FIG. 12C, the LEDs 170 come out of the holes 128. The structure of the LED is shown in FIG. 9. The LED 170 is adhered to the PCB 190 by soldering. The lens 170b of the LED covers the chip 170a, and the lens 170b transmits the light emitted from the chip 170a of the LED 170. As shown in FIG. 9, the lens 170b has a curved surface. Then, the reflecting sheet 125 and the graphite spreader 127 are respectively formed in correspondence with the lower surface of the LED lens 170b and the upper surface of the LED body 170c. Thus, the light emitted from the LED 170 is reflected to the upper side, whereby the heat generated from the LED 170 is diffused uniformly.

In the backlight unit according to the second embodiment of the present invention and the LCD device using the same, the PCB 190 is positioned on the cover bottom 120, and the graphite spreader 127 is formed around the circumference of the LED 170. Accordingly, the heat generated from the LEDs 170 is discharged to the outside through the graphite spreader 127, the PCB 190 and the cover bottom 120.

In the backlight unit according to the second embodiment of the present invention, the graphite spreader 127 of the great heat conduction efficiency is positioned adjacent to the chip 170a of the LED 170. As a result, the heat generated from the LEDs 170 is discharged to the outside. Accordingly, the heat does not stay in the junction between the LED 170 and the graphite spreader 127 and the LED 170. That is, the heat generated from the LED 170 is transmitted to the cover bottom 120 and the upper air layer through the graphite spreader 127, thereby obtaining the reliability in operation.

In the backlight unit according to the first embodiment of the present invention, the heat pipes 180 are formed in parallel to one another on the cover bottom 120, and the red R, green G and blue B LEDs 170 are formed on each of the heat pipes 180. In the backlight unit according to the second embodiment of the present invention, the reflecting sheet 125 and the graphite spreader 127 are positioned around the LEDs 170.

In another embodiment, the first embodiment and the second embodiment may be combined together so that both the heat pipes 180 in the first embodiment and the graphite spreader 127 in the second embodiment can discharge the heat generated by the LEDs 170 at the same time. In this embodiment, since both the heat pipes 180 and the graphite spreader 127 are used, the heat can be discharged faster than that in the first and second embodiments.

As mentioned above, the backlight unit and the LCD device according to the embodiments of the present invention have the following advantages.

In the backlight unit according to the first embodiment of the present invention, the heat pipes are provided below the LEDs, wherein the thermal conduction coefficient of the material for the heat pipe is several hundreds to thousands greater than the thermal conduction coefficient of aluminum or copper. That is, the heat-discharge efficiency in the backlight unit is improved according to the first embodiment of the present invention. Further, the temperature decreases in the junction between the LEDs and the heat pipes, thereby improving the thermal reliability in the backlight unit including the LEDs and the LCD device using the same backlight unit according to the first embodiment of the present invention.

The backlight unit according to the second embodiment of the present invention includes the graphite spreader as well as the heat pipes. Therefore, it is practicable to realize greater heat-discharge efficiency. That is, the LED chip and the LED lens are adhered to the graphite spreader, thereby improving the heat-discharge efficiency. Also, the heat concentrated to the LED chip is discharged rapidly. In addition, the heat is transmitted to the upper and circumferential sides of the LED. Therefore, the heat-discharge efficiency is improved by decreasing a load of heat-discharge.

The heat generated from the LED is discharged to the outside in a short time. Thus, when operating the backlight unit, the temperature of the LED is lowered. Therefore, it is practicable to realize the great light efficiency with improvement of the reliability on operation, thereby increasing the brightness.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a cover bottom;
   at least one heat pipe located on the cover bottom, wherein the at least one heat pipe includes a first plate and a second plate facing each other, a first wick on a surface of the first plate facing an opposite surface of the second plate and a second wick on the opposite surface of the second plate, and a sealing layer for providing a sealed space between the first and second plates and a working fluid being in the sealed space between the first and second plates, wherein the first plate and the second plate are made of copper and the working fluid is made of water; and
   a plurality of LEDs (light emitting diodes) located on the at least one heat pipe at fixed intervals.

2. The backlight unit of claim 1, wherein the plurality of LEDs include red R, green G and blue B light emitting diodes.

3. The backlight unit of claim 2, wherein each of the LEDs includes:
   an LED chip;
   a body on which the LED chip is mounted;

a chip die for connecting the body to the at least one heat pipe; and a transparent mold or lens for covering the LED chip.

4. The backlight unit of claim 3, wherein the chip die contacts the at least one heat pipe to transfer heat generated by the LED to the at least one heat pipe.

5. The backlight unit of claim 1, wherein the LEDs are adhered to the at least one heat pipe.

6. The backlight unit of claim 1, wherein the at least one heat pipe includes a plurality of heat pipes provided at fixed intervals on the cover bottom.

7. The backlight unit of claim 1, further comprising:
a reflecting sheet for reflecting light emitted from the LEDs; and
a graphite spreader, located on a bottom surface of the reflecting sheet, for discharging heat generated from the LEDs.

8. The backlight unit of claim 7, wherein the graphite spreader surrounds at least one of the LEDs, the heat generated by at least one of the LEDs being conducted to the graphite spreader.

9. The backlight unit of claim 7, wherein the graphite spreader has a plurality of holes for receiving the LEDs and surrounding circumferences of the LEDs.

10. The backlight unit of claim 7, wherein the plurality of LEDs contact the at least one heat pipe to transfer the heat generated by the plurality of LEDs to the at least one heat pipe.

11. A backlight unit comprising:
a cover bottom;
a plurality of printed circuit boards (PCBs) arranged in parallel to one another on the cover bottom;
a plurality of LEDs (light emitting diodes) on each of the PCBs at fixed intervals, wherein each of the LEDs includes at least an LED chip and a body on which the LED chip is mounted;
a reflecting sheet for reflecting light emitted from the LEDs upwardly; and
a graphite spreader, formed on a bottom surface of the reflecting sheet, for discharging heat generated from the plurality of LEDs,
wherein the reflecting sheet and the graphite spreader are positioned between the LED chip and the body.

12. The backlight unit of claim 11, wherein the graphite spreader surrounds at least one of the LEDs, the heat generated by at least one of the LEDs being conducted to the graphite spreader.

13. The backlight unit of claim 11, wherein the graphite spreader has a plurality of holes for receiving the LEDs and surrounding the circumferences of the LEDs.

14. The backlight unit of claim 11, wherein each of the LEDs further comprises:
a lead terminal for connecting the body to the graphite spreader; and
a lens for covering the LED chip, and transmitting the light emitted from the LED chip,
wherein the reflecting sheet and the graphite spreader are positioned below the LED lens and above the lead terminal.

15. The backlight unit of claim 14, wherein the lead terminal of the LED is adhered to the respective PCB.

16. The backlight unit of claim 11, wherein the graphite spreader includes material to have greater thermal conduction ratio than material of the cover bottom.

17. The backlight unit of claim 11, wherein the graphite spreader is formed in a plate shape by solidifying graphite particles and flat.

18. The backlight unit of claim 11, wherein the graphite spreader has a thermal conduction coefficient of 400 to 800 W/mK.

19. A liquid crystal display (LCD) device comprising:
a cover bottom;
at least one heat pipe located on the cover bottom, wherein the at least one heat pipe includes a first plate and a second plate facing each other, a first wick on a surface of the first plate facing an opposite surface of the second plate and a second wick on the opposite surface of the second plate, and a sealing layer for providing a sealed space between the first and second plates and a working fluid being in the sealed space between the first and second plates, wherein the first plate and the second plate are made of copper and the working fluid is made of water;
a plurality of light emitting diodes (LEDs) formed on the at least heat pipe at fixed intervals; and
an LCD panel located above the plurality of LEDs.

20. The LCD device of claim 19, further comprising:
a plurality of optical sheets formed on the plurality of LEDs, the LCD panel being located on the plurality of optical sheets;
a guide panel for supporting the optical sheets and the LCD panel; and
a case top provided at an upper edge of the LCD panel and lateral sides of the guide panel and the cover bottom.

21. A liquid crystal display (LCD) device comprising:
a cover bottom;
a plurality of printed circuit boards (PCBs) arranged in parallel to one another on the cover bottom, wherein each of the LEDs includes at least an LED chip and a body on which the LED chip is mounted;
a plurality of light emitting diodes (LEDs) on each of the PCBs at fixed intervals;
a reflecting sheet, provided in a circumference of the LEDs, for reflecting light emitted from the LEDs upwardly;
a graphite spreader, formed on a bottom surface of the reflecting sheet, for discharging heat generated from the plurality of LEDs, wherein the graphite spreader has a plurality of holes for receiving the LEDs and surrounding the circumferences of the LEDs; and
an LCD panel located above the plurality of LEDs,
wherein the reflecting sheet and the graphite spreader are positioned between the LED chip and the body through the holes.

22. The LCD device of claim 21, further comprising:
a plurality of optical sheets formed on the plurality of LEDs, the LCD panel being located on the plurality of optical sheets;
a guide panel for supporting the optical sheets and the LCD panel; and
a case top provided at an upper edge of the LCD panel and lateral sides of the guide panel and the cover bottom.

23. The LCD device of claim 21, wherein the graphite spreader surrounds at least one of the LEDs, the heat generated by at least one of the LEDs being conducted to the graphite spreader.

24. A liquid crystal display (LCD) device comprising:
a cover bottom;
at least one heat pipe located on the cover bottom, wherein the heat pipe includes a first plate and a second plate facing each other, a first wick on a surface of the first plate facing an opposite surface of the second plate and a second wick on the opposite surface of the second plate, and a sealing layer for providing a sealed space between the first and second plates and a working fluid being in the sealed space between the first and second plates, wherein the first plate and the second plate are made of copper and the working fluid is made of water;

a plurality of light emitting diodes (LEDs) formed on at least one heat pipe at fixed intervals, wherein each of the LEDs includes at least an LED chip and a body on which the LED chip is mounted;

a reflecting sheet, formed in the circumference of the LEDs, for reflecting light emitted from the LEDs upwardly;

a graphite spreader, formed on a lower surface of the reflecting sheet, for discharging heat generated from the plurality of LEDs to the outside, wherein the graphite spreader and reflecting sheet have a plurality of holes for receiving the LEDs and surrounding the circumferences of the LEDs; and an LCD panel located above the plurality of LEDs, wherein the reflecting sheet and the graphite spreader are positioned between the LED chip and the body, through the holes.

25. The LCD device of claim 24, further comprising:

a plurality of optical sheets formed on the plurality of LEDs, the LCD panel being located on the plurality of optical sheets;

a guide panel for supporting the optical sheets and the LCD panel; and a case top provided at an upper edge of the LCD panel and lateral sides of the guide panel and the cover bottom.

26. The LCD device of claim 24, wherein the graphite spreader surrounds at least one of the LEDs, the heat generated by at least one of the LEDs being conducted to the graphite spreader.

27. The LCD device of claim 24, wherein the LEDs contact the at least one heat pipe to transfer the heat generated by the LED to the at least one heat pipe.

* * * * *